United States Patent
Sharkey

(10) Patent No.: US 9,225,685 B2
(45) Date of Patent: *Dec. 29, 2015

(54) FORCING ALL MOBILE NETWORK TRAFFIC OVER A SECURE TUNNEL CONNECTION

(71) Applicant: GOOGLE INC., Mountain View, CA (US)

(72) Inventor: Jeff Sharkey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,744

(22) Filed: Oct. 3, 2014

(65) Prior Publication Data

US 2015/0082419 A1    Mar. 19, 2015

Related U.S. Application Data

(63) Continuation of application No. 13/488,146, filed on Jun. 4, 2012, now Pat. No. 8,875,277, and a continuation of application No. PCT/US2013/044084, filed on Jun. 4, 2013.

(51) Int. Cl.
*G06F 15/177* (2006.01)
*H04L 29/06* (2006.01)
*H04W 12/08* (2009.01)
*H04W 88/02* (2009.01)

(52) U.S. Cl.
CPC .......... *H04L 63/0272* (2013.01); *H04L 63/029* (2013.01); *H04L 63/0227* (2013.01); *H04L 63/0263* (2013.01); *H04W 12/08* (2013.01); *H04W 88/02* (2013.01)

(58) Field of Classification Search
CPC ... H04L 63/20; H04L 63/029; H04L 63/0227; H04L 63/0263; H04L 63/0272; G06F 15/177; G06F 21/606
USPC ...................................................... 726/11–15
See application file for complete search history.

(56) References Cited

U.S. PATENT DOCUMENTS

| | | | |
|---|---|---|---|
| 7,131,141 B1 | 10/2006 | Blewett et al. | |
| 7,441,043 B1 | 10/2008 | Henry et al. | |
| 7,992,201 B2 | 8/2011 | Aldridge et al. | |
| 2005/0198532 A1* | 9/2005 | Comlekoglu | ....... H04L 63/0272 726/5 |
| 2007/0150946 A1 | 6/2007 | Hanberger et al. | |
| 2007/0294410 A1 | 12/2007 | Pandya et al. | |

(Continued)

OTHER PUBLICATIONS

Dschuett: "Force a 11 internet traffic 1-17 through tun8 (Vpn Interface)", Aug. 9, 2011 XP855878923, Retrieved from the Internet: URL:http://www.linuxquestions.org/questions/linux-security-4/force-a11-internet-traffic-through-tun0-vpn-interface-896458/ [retrieved on Sep. 12, 2013].

(Continued)

*Primary Examiner* — Joseph P Hirl
*Assistant Examiner* — Kalish Bell
(74) *Attorney, Agent, or Firm* — Shumaker & Sieffert, P.A.

(57) ABSTRACT

A process is disclosed in which all network traffic between a mobile device and an untrusted network arriving before the establishment of a VPN tunnel are dropped in response to rules imposed by the mobile device's operating system. Once a VPN tunnel is established all communication from the mobile device is secured, without an intervention on the part of the user of the device. A device supporting such a process is also disclosed.

11 Claims, 3 Drawing Sheets

(56) References Cited

U.S. PATENT DOCUMENTS

2009/0031415 A1* 1/2009 Aldridge ............. H04L 63/0272 726/15
2009/0089872 A1 4/2009 Arkko et al.
2009/0106830 A1 4/2009 Maher

OTHER PUBLICATIONS

Jaiya: 'iptables—only allow connections through vpn', linuxquestions.org, Jun. 27, 2011, XP055078945, Retrieved from the Internet: URL:http://www.linuxquestions.org/questions/linux-security-4/iptables-only-allow-connections-through-vpn-888650/ [retrieved on Sep. 12, 2013].
Ramesh Natarajan: 'Linux IPTables: Incoming and Outgoing Rule Examples (SSH and HTTP)', Mar. 15, 2011, XP055078948, Retrieved from the Internet: URL:http://www.thegeekstuff.com/2011/03/iptables-inbound-and-outbound-rules/ [retrieved on Sep. 12, 2013].
Nicholas Haggin: 'Securing an 802.11a/b/g Network with a VPN using Linux 2.6', Jul. 16. 2005, XP055078910, Retrieved from the Internet: URL:http://nhaggin.freeshell.org/wireless-vpn-howto/index.html [retrieved on Sep. 12, 2013].
PCT Search Report and Written Opinion; PCT/US20113/044084; European Patent Office International Searching Authority; Sep. 23, 2013.
Daniel Cooper, "NSA builds own model of Android phone, wants you to do the same", http://www.engadget.com/2012/03/01/nsa-builds-own-model-of-android-phone-wants-you-to-do-the-same/, Mar. 1, 2012; 3:54 pm.
https://play.google.com/store/apps/details?id=hotspotshield.android.vpn, Sep. 19, 2012.
Netfilter Hook: Basic Packet Fitering in Kernel by erik dated Sep. 13, 2011, retrieved on Jun. 27, 2013©http://www.lainoox.com/netfilter-hook-packet-filter/.
http://scholar.google.com/scholar search results for "VPN and iptable and establish and 'packet filter' and 'linux kernel'"; Jun. 13, 2014.
http://scholar.google.com/scholar search results for "VPN and iptable and 'packet filter' and 'linux kernel'"; Jun. 13, 2014.
http://scholar.google.com/scholar search results for "VPN and iptable and 'packet filter'"; Jun. 13, 2014.

* cited by examiner

FORCING ALL MOBILE NETWORK TRAFFIC OVER A SECURE TUNNEL CONNECTION

FIELD

This disclosure relates to network security, in particular for providing virtual private network tunneling for traffic with mobile devices.

BACKGROUND

Mobile devices such as smart phones and tablets have become so convenient that they are constantly available to users and therefore become natural depositories for confidential information. To protect that information there are various applications that provide encryption for the information where it resides. Communication of the information requires additional protection. Such protection is insufficient unless either the communication takes place over secure networks (i.e. trusted networks) or the communication of that confidential information to remote servers takes place over insecure public networks such as the Internet but is nevertheless protected by encryption.

To provide protection for such communication over the Internet or other untrusted networks, encryption and decryption between servers that is transparent to the user has been developed. In particular secure tunnels otherwise known as virtual private networks or VPNs have been developed for use between servers on otherwise insecure networks.

Typically, a mobile device resides on the edge of such a system, and communicates to a server on a trusted network via a secure tunnel that runs across the Internet. The communication from the mobile device thus requires protection of the initial trusted network that joins the mobile device to a server and the protection of a tunnel between the external servers.

SUMMARY

To assure the security of all information from a mobile device such as a smart phone, a VPN handler encrypts outbound network packets and decrypts inbound network packets to securely tunnel the network packets between the mobile device and the trusted remote host. In response to rules imposed to control packet filtering inside the mobile device's operating system's kernel, communication packets between the mobile device and any Internet host arriving before the establishment of the VPN tunnel are dropped. Once a VPN tunnel is established all communication from the mobile device is secured, without an intervention on the part of the user of the device.

In one example, a mobile device communicates with a trusted remote host over an untrusted network by the steps of sending and receiving communication packets between the mobile device and the trusted remote host over the untrusted network pursuant to iptable rules of a Linux kernel or network routing tables of the operating system of the mobile device, sufficient to establish a virtual private network (VPN) connection; establishing at the mobile device a VPN connection with the trusted remote host, wherein the mobile device comprises a VPN handler that encrypts outbound network packets and decrypts inbound network packets to securely tunnel the network packets between the mobile device and the trusted remote host; rejecting, in response to the iptable rules or network routing tables, packet traffic over the untrusted network other than those packets necessary to the establishment of the VPN connection, the rejection continuing until the VPN connection is established, and following establishment of the VPN connection, receiving all packet traffic over the VPN connection.

In another example, a mobile device communicates with a trusted remote host over an untrusted network by booting the operating system of the mobile device, creating iptable rules denying all network traffic, connecting the mobile device to a cellular, Ethernet, bluetooth or WiFi network, adding iptables rules to allow network traffic only to a VPN endpoint, starting a VPN connection, and adding iptables rules allowing traffic to the local VPN endpoint if the mobile device is connected to the VPN.

In a third example, the mobile device that communicates with a trusted remote host over an untrusted network comprises a transmitter and receiver to send and receive communications in the form of radio frequency signals; a microprocessor; an operating system executing on the microprocessor to provide an operating environment for application software; and a VPN handler to establish a VPN connection with the trusted remote host over the untrusted network pursuant to iptable rules of a Linux kernel of the operating system of the mobile device, sufficient to establish a virtual private network (VPN) connection. The VPN handler is configured to establish at the mobile device a VPN connection with the trusted remote host, and encrypt outbound network packets and decrypts inbound network packets to securely tunnel the network packets between the mobile device and the trusted remote host. In response to the iptable rules, packet traffic over the untrusted network may be rejected other than those packets necessary to the establishment of the VPN connection until the VPN connection is established. Following establishment of the VPN connection, all packet traffic is then received over the VPN connection.

In additional examples, other tools than iptables may be used to control packet filtering inside the OS kernel networking stack. Examples of operating systems that have such tools include BSD-style UNIX variants, but other operating systems providing equivalent functionality are meant to be included as well.

DETAILED DESCRIPTION

Figure 1:
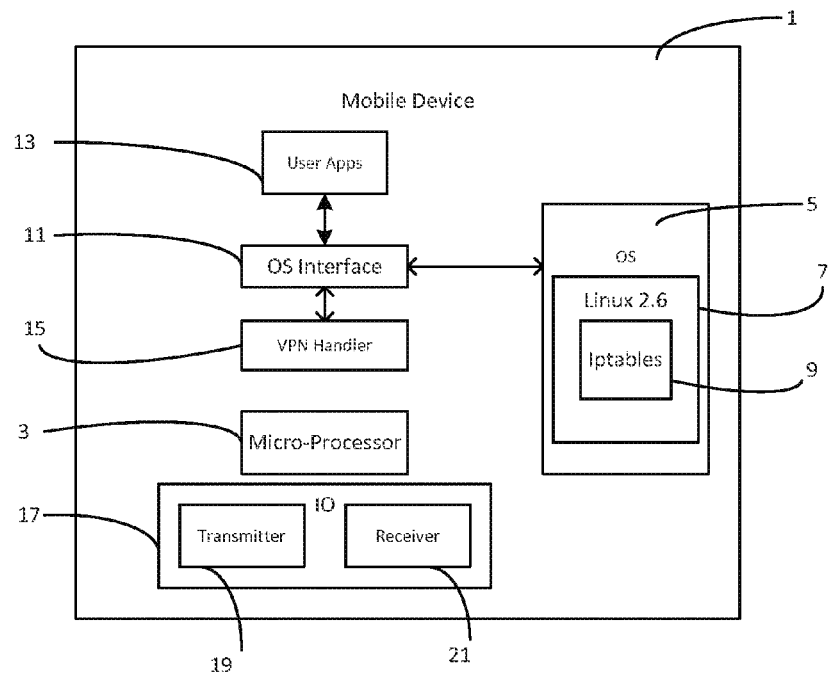
FIG. 1 is a schematic depiction of the components of mobile device that can implement the present disclosure.

In one embodiment of the invention as shown in FIG. 1 a mobile device 1, such as a cell phone, comprises a microprocessor 3, which runs under an operating system 5, for example having a Linux kernel 7 running under iptables 9. The operating system 5 communicates through an interface 11 with one or more user apps 13. The operating system interface 11 also communicates with a VPN handler 15 that interfaces an input/output handler 17 that controls hardware transmitters and receivers 19, 21.

Figure 2:
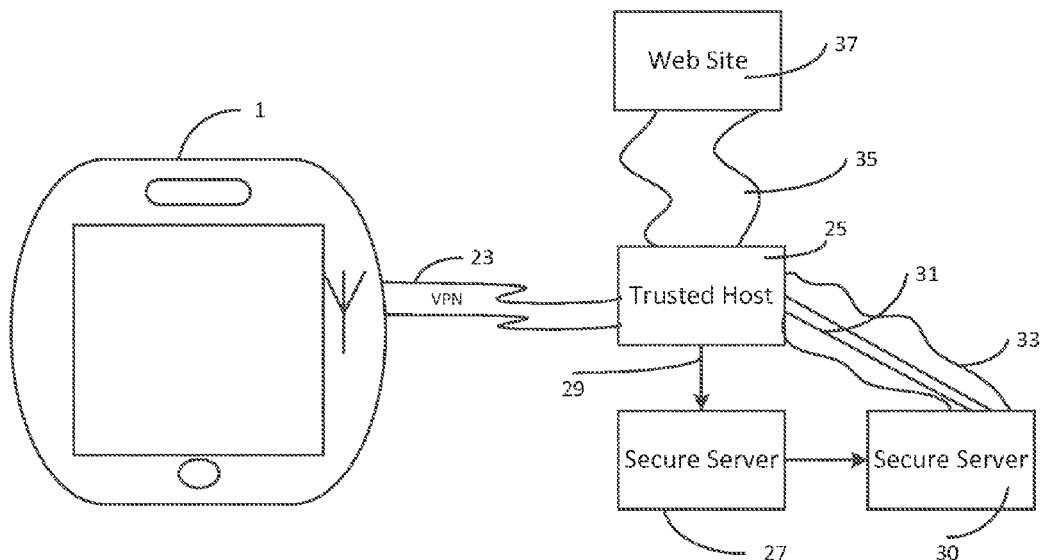
FIG. 2 is a schematic depiction of a network that implements the present invention according to one example of the present disclosure.

The mobile device 1, as shown in FIG. 2, communicates through a remote access VPN tunnel with a trusted host 25. To secure the system further, the communication ports for either or both the mobile device and the trusted host which the VPN addresses may be predetermined. The trusted host, which is generally a server, may then further communicate with another secure server 27 over a trusted network 29, or with another secure server 30 over a second VPN 31 over an insecure or untrusted network 33. The trusted host 25 may also communicate over the public Internet 35 with various websites 37. An important point is that all communication between the mobile unit 1 and devices external to it is secured either by the known security of the secure servers or the virtual private networks.

To assure the security of all information from the mobile device, the VPN handler encrypts outbound network packets and decrypts inbound network packets to securely tunnel the network packets between the mobile device and the trusted remote host. The VPN may serve any network functionality that is found on any network, such as sharing of data and access to network resources, printers, databases, websites, etc. The VPN user may access a central company network just as if connected directly to the central network. It may also be constructed to operate at either the operating system data link layer (a so-called OSI layer 2 system) or at a network layer (OSI layer 3). Other OSI layer systems are also possible. Various manners of encryption and packet encapsulation are known to persons of skill in this art. The delivery protocol typically operates as a higher level in the OSI model than does the payload protocol, or it may be at the same level. Examples of VPN tunneling protocols are Generic Routing Encapsulation (GRE) and Layer 2 Tunneling Protocol (L2TP). SSH tunneling can be implemented through SSH protocol connections. To set up a SSH tunnel, one configures an SSH client to forward a specified local port to a port on a remote machine. A SOCKS 4/5 proxy can be used to avoid the restriction to a single port for the tunnel termination.

Figure 5:
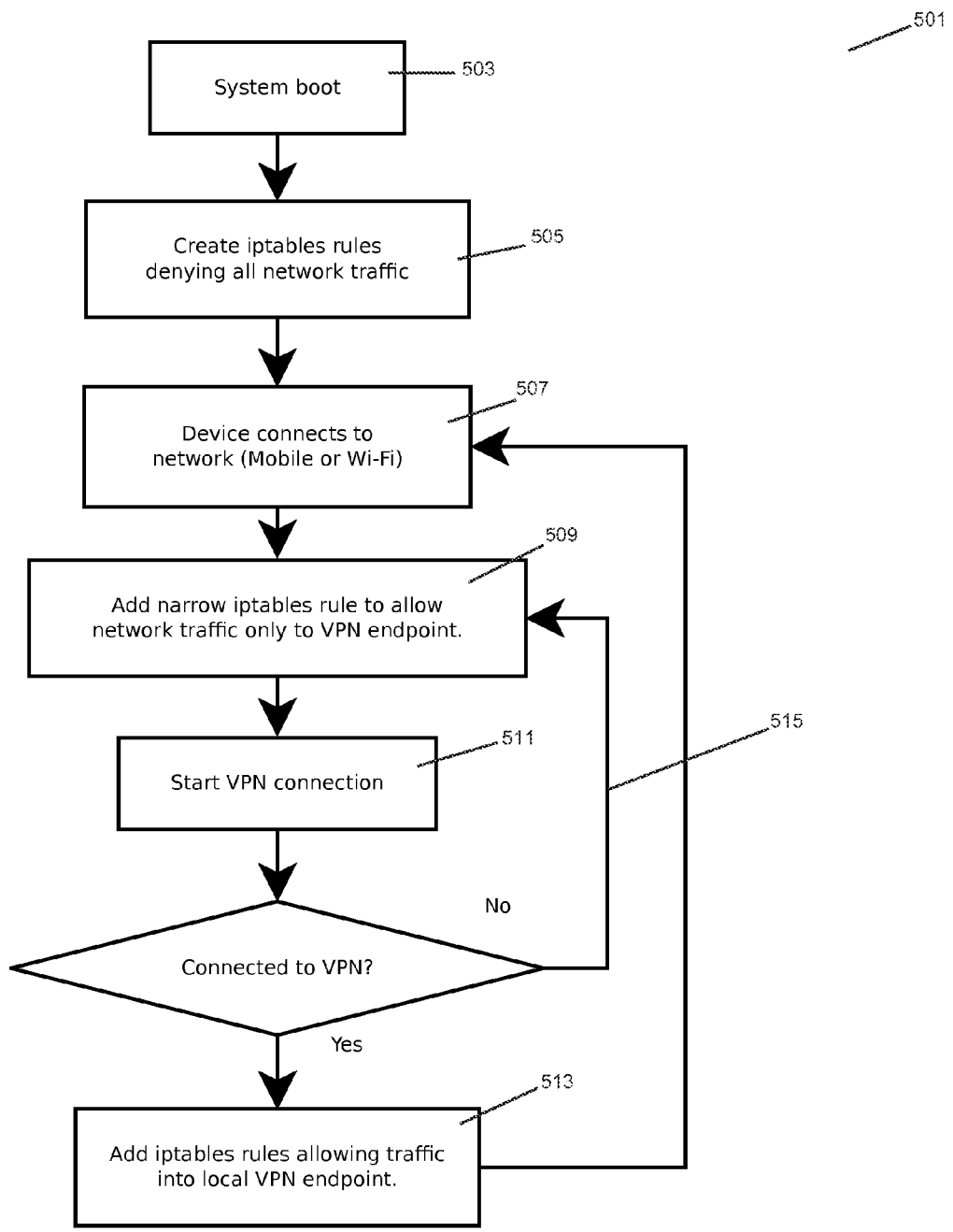
FIG. 5 is a flow chart indicating the sequence of iptable rule modifications in an example of the present disclosure.

FIG. 5 is a flow chart showing the initiation of the VPN traffic for the present invention. After system boot, iptables rules are established to deny all network traffic. The device then connects to the either a cellular or a WiFi network. Narrow iptables rules are set to allow network traffic only to the VPN endpoints on a trusted network. The VPN connection is then started. If the connection is established, the iptables rules are changed to allow traffic into the local VPN endpoint and the mobile device is reported as connected to the network. If at any point the VPN connection fails, or the device reconnects to a different network, the device attempts to restart the VPN connection.

Figure 3:
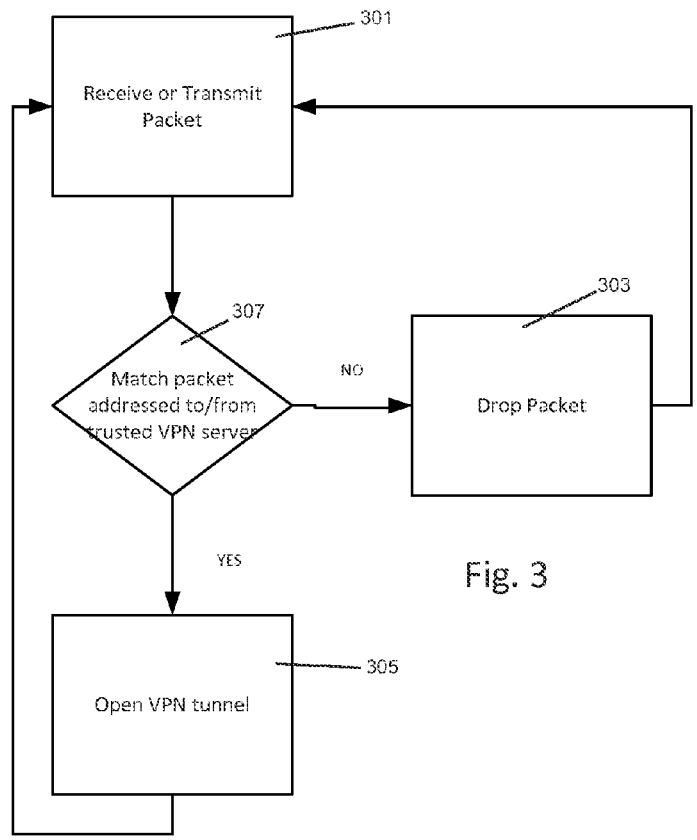
FIG. 3. is a flow chart of the path of a packet in an example according to the present disclosure.

As shown in FIG. 3, in response to rules imposed by the iptables 9 of the Linux kernel 7, communication packets between the mobile device and the secure server arriving before the establishment of the VPN tunnel will be dropped. In this way it is assured that all communication to or from the mobile device is secured with the exception of the minimum of communication necessary to establish the VPN tunnel between the devices. Once the VPN tunnel is established all communication from the mobile device is secured, without an intervention on the part of the user of the device. When a packet is received 41 the system branches depending on whether the VPN encoding is active 43. If it is active, the packet is received 45 and the process repeats. If VPN encoding is not active, the packet is dropped 49 and the system attempts to restore a VPN tunnel 49 and await the next packet 41.

Establishing a tunnel requires a minimum of communication. The tunnel endpoints must be authenticated before secure VPN tunnels can be established. This may be done by exchanging passwords, two-factor authentication or some other cryptographic method. Passwords or digital certificates can permanently store a key to allow tunnels to be established without intervention by the user.

Figure 4:
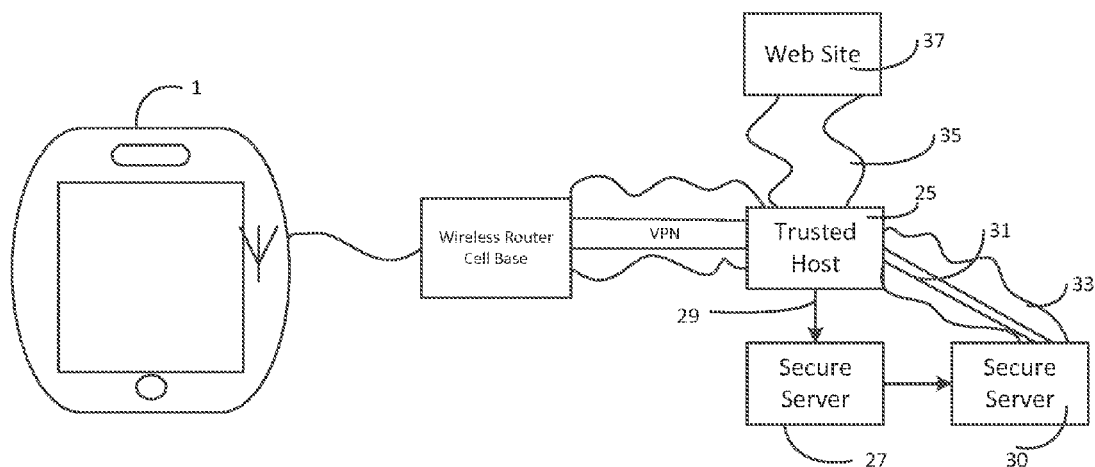
FIG. 4 is an alternative schematic depiction of a network that implements the present invention according to another example of the present disclosure.

An alternative is shown in FIG. 4 where a mobile device communicates over a trusted network to a system having a VPN tunnel between a trusted host and secure servers. Since the VPN tunnel is between systems remote from the mobile device, it leaves the mobile device less secure.

Although the device has been described with respect to particular implementations, it should be understood that the scope of the invention is not limited to details of the description. In particular, the scope of the implementations encompasses various operating systems having the ability to control network packet filtering.

I claim:

1. A method for a mobile device having an operating system (OS) to communicate with a trusted remote host over an untrusted network comprising sending and receiving communication packets between the mobile device and the trusted remote host over the untrusted network pursuant to controls of packet filtering at the kernel level of the operating system of the mobile device, sufficient to establish a virtual private network (VPN) connection;

establishing at the mobile device a VPN connection with the trusted remote host, wherein the mobile device comprises a VPN handler that encrypts outbound network packets and decrypts inbound network packets to securely tunnel the network packets between the mobile device and the trusted remote host;

rejecting, in response to controls of packet filtering at the kernel level, packet traffic over the untrusted network other than those packets necessary to the establishment of the VPN connection, said rejection continuing until the VPN connection is established, following establishment of the VPN connection, receiving all packet traffic over the VPN connection:

when the VPN connection disconnects or fails to connect, causing a browser program to create a set of network rules that enable user intervention which allows establishment of a secure tunnel that proceeds over the untrusted network between the mobile device and the trusted remote host; and wherein the network rules and the packet filtering rules are BSD (Berkeley Style Distribution)—style UNIX variants of the OS to control packet filtering inside an OS kernel networking stack.

2. The method according to claim 1 further comprising upon disconnect or failure to connect, allowing a browser to create a set of network rules to enable user intervention to allow establishment of a secure tunnel to proceed over the untrusted network between the mobile device and the trusted remote host.

3. The method according to claim 1 wherein the packet traffic over the untrusted network is limited to packets addressed to a predetermined port on the trusted remote host.

4. The method according to claim 1 wherein the packet traffic over the VPN connection is limited to packets addressed to a predetermined port on the mobile device.

5. The method according to claim 2, further comprising allowing specific applications resident on the mobile device to perform traffic over the untrusted network.

6. A method for a mobile device to communicate with a trusted remote host over an untrusted network comprising sending and receiving communication packets between the mobile device and the trusted remote host over the untrusted network pursuant to network routing tables of the operating system of the mobile device, sufficient to establish a virtual private network (VPN) connection;

establishing at the mobile device a VPN connection with the trusted remote host, wherein the mobile device comprises a VPN handler that encrypts outbound network packets and decrypts inbound network packets to securely tunnel the network packets between the mobile device and the trusted remote host;

rejecting in response to network routing tables packet traffic over the untrusted network other than those packets necessary to the establishment of the VPN connection, said rejection continuing until the VPN connection is established, following establishment of the VPN connection, receiving all packet traffic over the VPN connection:

when the VPN connection disconnects or fails to connect, causing a browser program to create a set of network rules that enable user intervention which allows establishment of a secure tunnel that proceeds over the untrusted network between the mobile device and the trusted remote host; and wherein the network rules and the packet filtering rules are BSD (Berkeley Style Distribution)-style UNIX variants of the OS to control packet filtering inside an OS kernel networking stack.

7. The method according to claim 6 wherein the packet traffic over the VPN connection is limited to packets addressed to a predetermined port on the trusted remote host.

8. The method according to claim 6 wherein the packet traffic over the VPN connection is limited to packets addressed to a predetermined port on the mobile device.

9. The method according to claim 6, further comprising allowing applications resident on the mobile device to perform traffic over the VPN connection.

10. A mobile device to communicate with a trusted remote host over an untrusted network comprising:

a transmitter and receiver to send and receive communications in the form of radio frequency signals;

a microprocessor configured to cause a browser program, upon disconnect or failure to connect, to create a set of network rules that enable user intervention which allows establishment of a secure tunnel that proceeds over the untrusted network between the mobile device and the trusted remote host;

an operating system executing on said microprocessor to provide an operating environment for application software; and a VPN handler to establish a VPN connection with the trusted remote host over the untrusted network pursuant to packet filtering rules of the operating system of the mobile device, sufficient to establish a virtual private network (VPN) connection;

wherein the VPN handler is configured to:

establish at the mobile device a VPN connection with the trusted remote host, and to encrypt outbound network packets and decrypt inbound network packets to securely tunnel the network packets between the mobile device and the trusted remote host;

reject, in response to the packet filtering rules, packet traffic over the untrusted network other than those packets necessary to the establishment of the VPN connection, said rejection continuing until the VPN connection is established; and following establishment of the VPN connection, receive all packet traffic over the VPN connection wherein the network rules and the packet filtering rules are BSD (Berkeley Style Distribution)-style UNIX variants of the OS to control packet filtering inside an OS kernel networking stack.

11. The mobile device according to claim 10, wherein said microprocessor is further configured to permit specific applications resident on the mobile device to perform traffic over the untrusted network.

* * * * *